No. 790,375. PATENTED MAY 23, 1905.
R. C. MEALEY.
MILK WEIGHING APPARATUS.
APPLICATION FILED SEPT. 13, 1904.
6 SHEETS—SHEET 1.
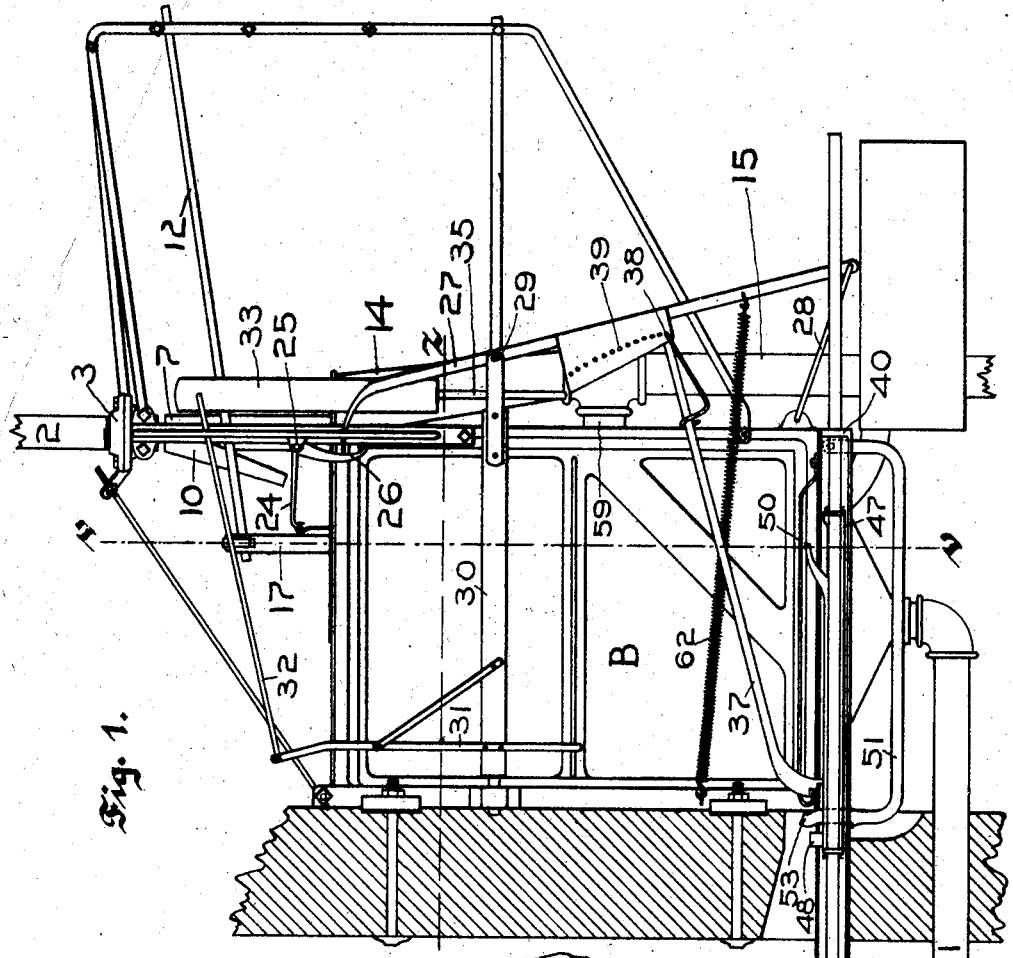
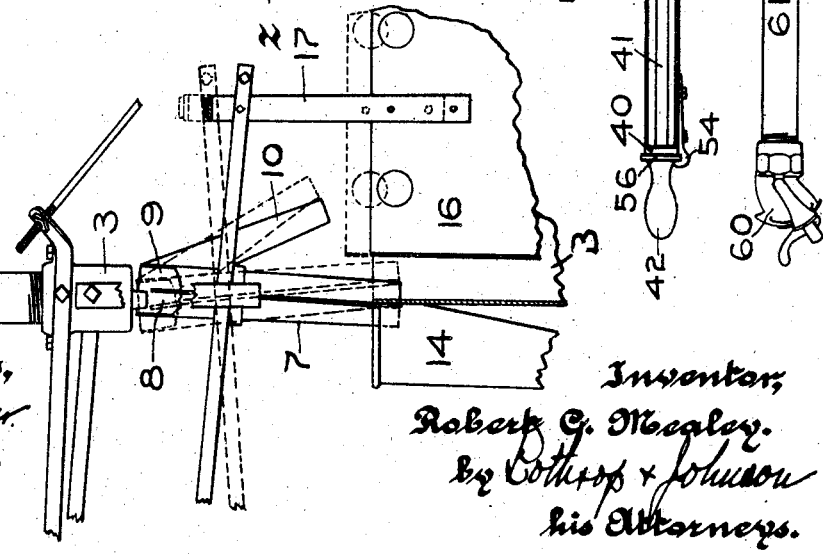
Witnesses,
W. H. Palmer.
Emily F. Otis.
Inventor,
Robert C. Mealey.
By Lothrop & Johnson
his Attorneys.

No. 790,375. PATENTED MAY 23, 1905.
R. C. MEALEY.
MILK WEIGHING APPARATUS.
APPLICATION FILED SEPT. 13, 1904.
6 SHEETS—SHEET 2.
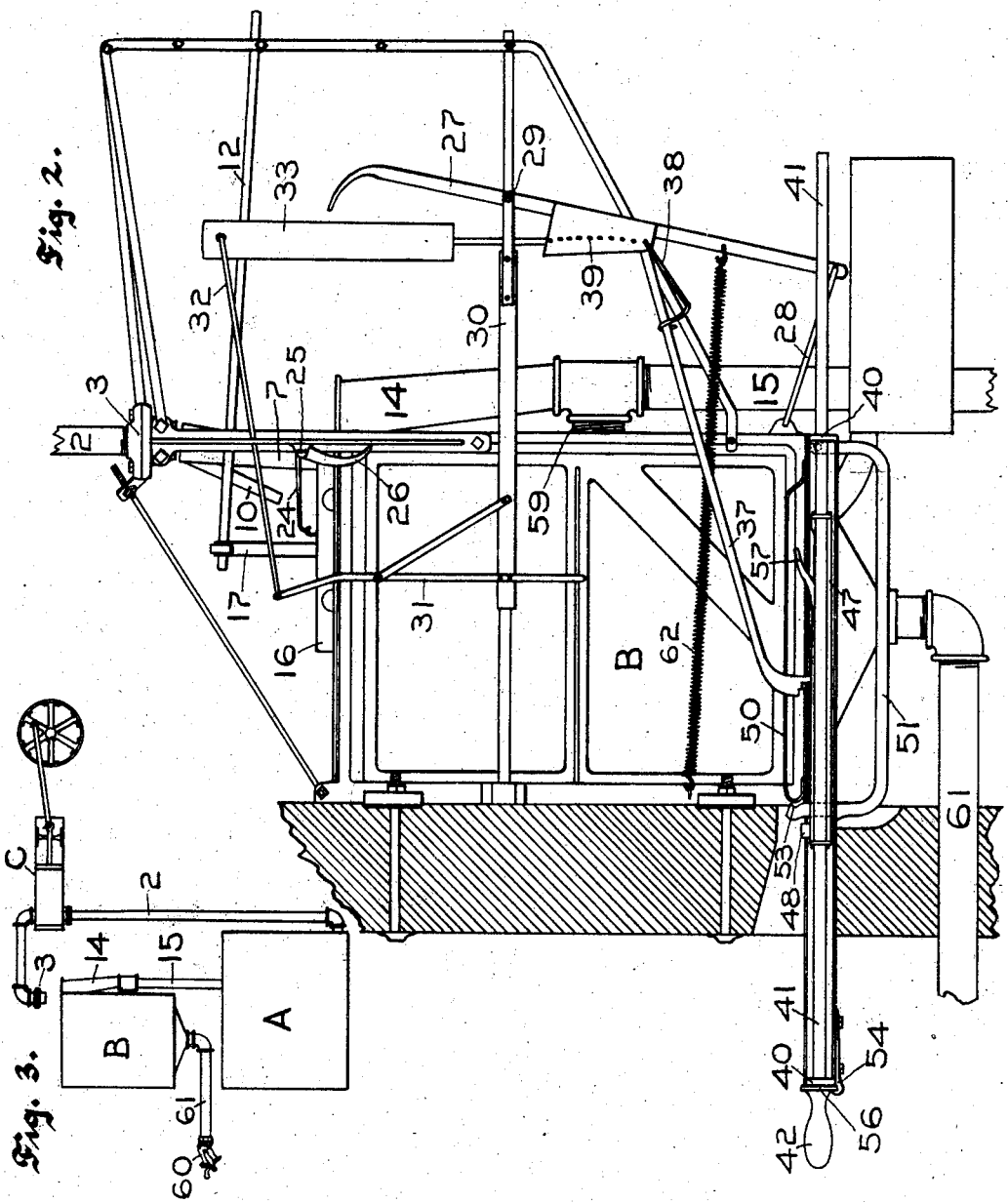
Witnesses,
W. H. Palmer
Emily F. Otis
Inventor,
Robert C. Mealey.
by Lothrop & Johnson
his Attorneys.

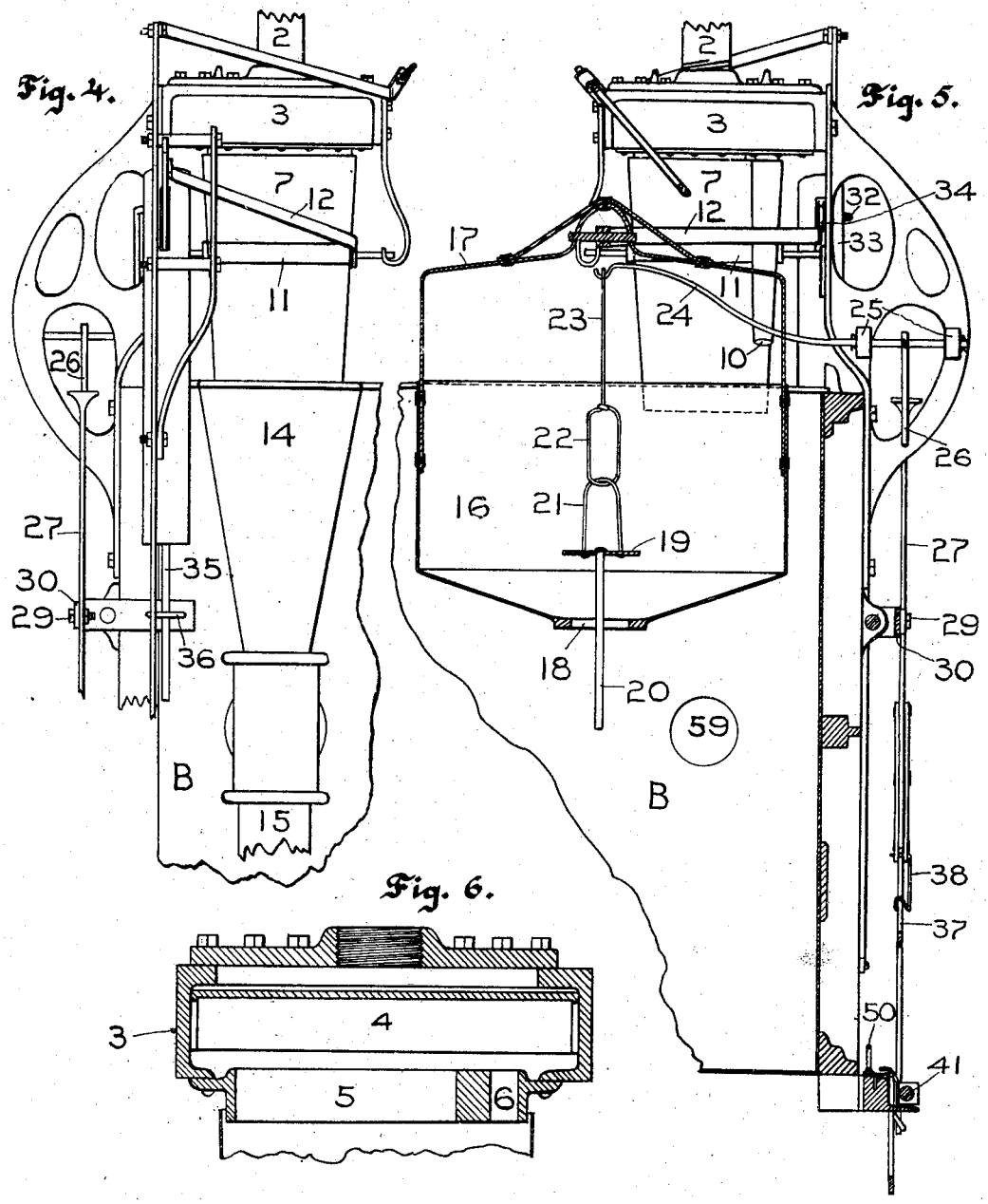

No. 790,375. PATENTED MAY 23, 1905.
R. C. MEALEY.
MILK WEIGHING APPARATUS.
APPLICATION FILED SEPT. 13, 1904.

6 SHEETS—SHEET 4.

Witnesses,
W. H. Palmer
Emily F. Otis

Inventor,
Robert C. Mealey.
by Lothrop & Johnson
his Attorneys.

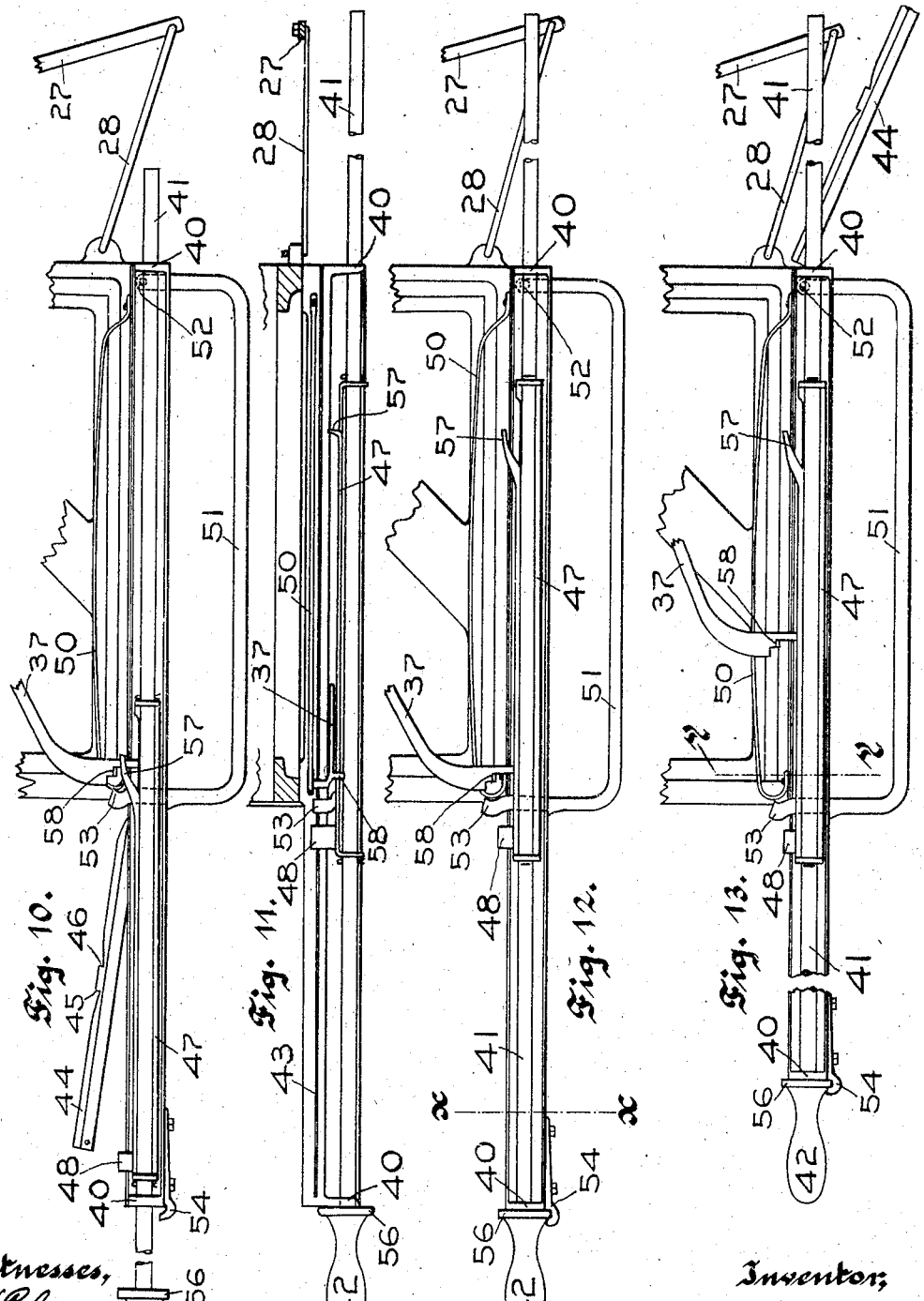

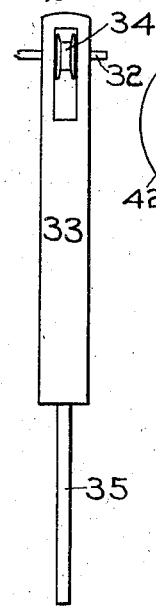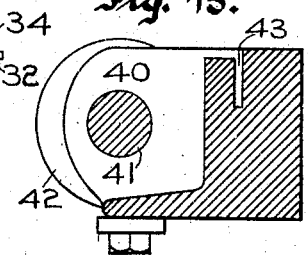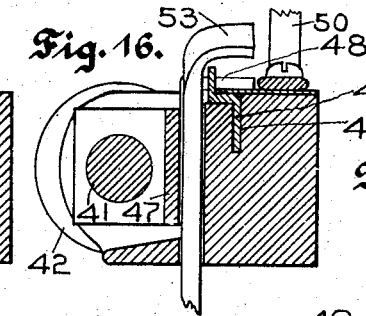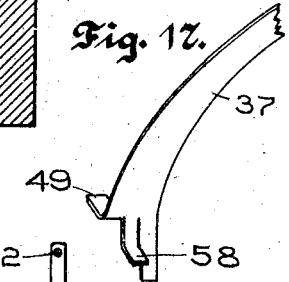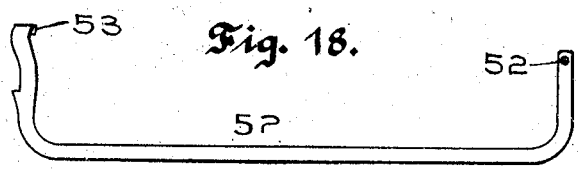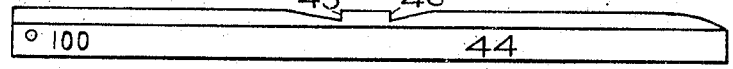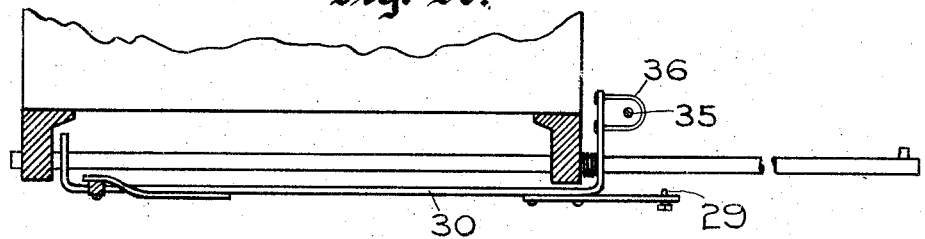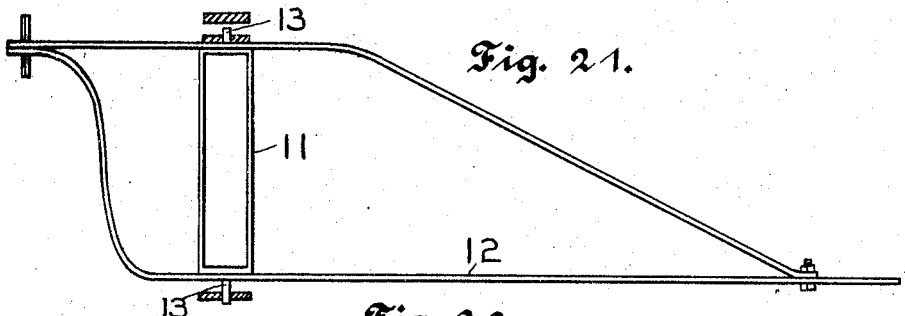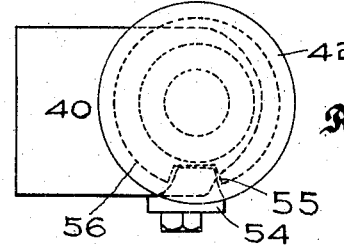

No. 790,375. Patented May 23, 1905.

UNITED STATES PATENT OFFICE.

ROBERT C. MEALEY, OF HOWARD LAKE, MINNESOTA.

MILK-WEIGHING APPARATUS.

SPECIFICATION forming part of Letters Patent No. 790,375, dated May 23, 1905.

Application filed September 13, 1904. Serial No. 224,247.

*To all whom it may concern:*

Be it known that I, ROBERT C. MEALEY, a citizen of the United States, residing at Howard Lake, in the county of Wright and State of Minnesota, have invented certain new and useful Improvements in Milk-Weighing Apparatus, of which the following is a specification.

My invention relates to improvements in weighing-machines designed especially for weighing the milk to be delivered back to the farmers at creameries; and it consists particularly in the features of construction and combination hereinafter particularly described and claimed.

Figure 7:
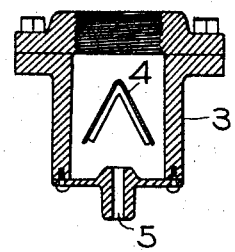
Figure 8:
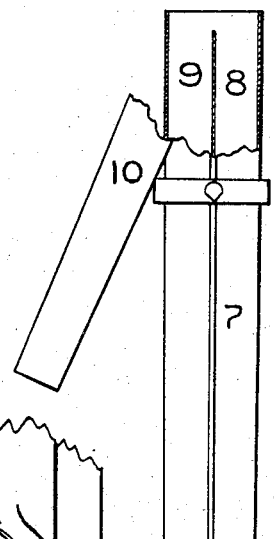
Figure 9:
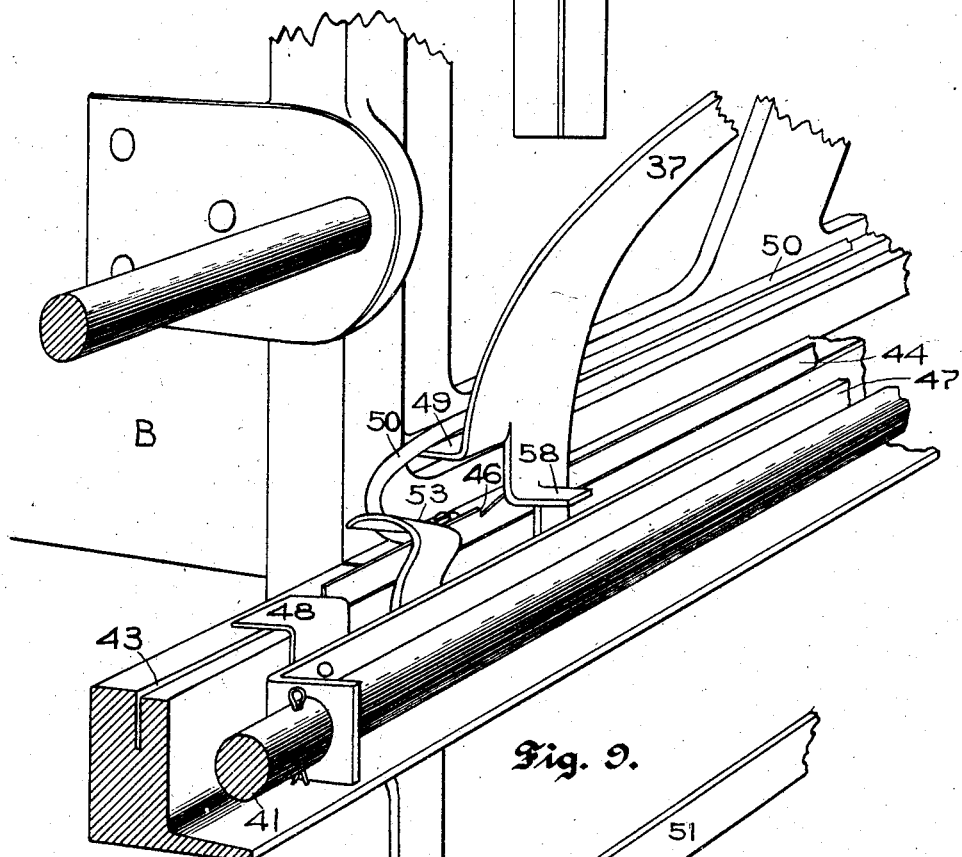

In the accompanying drawings, forming part of this specification, Figure 1 is a front elevation of my improved weighing-machine in normal position. Fig. 2 is a similar view showing the parts in position for measuring a predetermined quantity of milk. Fig. 3 is a diagrammatic view of my invention and connected parts. Fig. 4 is a partial rear view of my invention. Fig. 5 is a vertical section taken on line *v v* of Fig. 1. Fig. 6 is a vertical longitudinal section of an inlet milk-distributer. Fig. 7 is a vertical section of the same, taken at right angles to Fig. 6. Fig. 8 is a side elevation, partly broken away, of the conduits leading from the distributer. Fig. 9 is a perspective view of the check-actuated mechanism. Fig. 10 is a side elevation of the check-actuated mechanism, showing a check about to be placed in the machine. Fig. 11 is a plan view of the same in normal position. Fig. 12 is a side elevation in normal position. Fig. 13 is a side elevation in weighing position. Fig. 14 is a detail of the counterbalancing-weight. Figs. 15 and 16 are sections on line *x x* and *y y* of Figs. 12 and 13. Fig. 17 is a detail of one end of the check-actuated lever. Fig. 18 is a detail of the check-retaining arm. Fig. 19 is a detail of the check. Fig. 20 is a partial section on line *z z* of Fig. 1. Fig. 21 is a detail of the scale-beam. Fig. 22 is an end view of the actuating-handle of the machine; and Fig. 23 is a rear view of the milk-distributing mechanism, partly in section.

In the drawings, A represents the reserve-tank in which the milk is kept inside the creamery.

B represents a vertical open-top tank forming part of my apparatus and connected with the reserve-tank A by means of a pipe 2, containing a suitably-actuated pump C, by which the milk is forced from the reserve-tank through the pipe 2. The pipe 2 opens into a distributer 3. (Shown in detail in Figs. 6 and 7.) The distributer has within it a V-shaped spreader 4 and outlet-openings 5 and 6, the opening 5 being considerably longer than the opening 6. Below the distributer is pivotally supported a pipe 7, divided to form a conduit 8, and upon the opposite side conduits 9 and 10, corresponding with the openings 5 and 6 of the distributer. The pipe 7 is secured within a strap 11, carried by the scale-beam 12 and having gudgeons 13 pivotally supporting the scale-beam in the framework. In the normal position of the machine the passage 8 of the conduit 7 registers with the milk-distributer and guides the milk into the funnel 14, which connects by a pipe 15 with the reserve-tank. When the machine is weighing, the passages 9 and 10 will register with the milk-distributer to guide the milk into the weighing and receiving tanks, as hereinafter described.

Supported by the inner end of the scale-beam is a weighing bucket or tank 16, connected with the scale-beam by a bail 17. The weighing-bucket hangs within the milk-receiving tank B. The bucket 16 is provided with a bottom opening 18, adapted to be closed by a valve 19, provided with a guide-rod 20, extending through said opening. The valve is connected by links 21 and 22 with a rod 23, detachably supported upon the end of a lever-arm 24. The lever-arm 24 has pivotal support 25 in the frame of the machine and is provided with a downwardly-extending finger 26. Working in connection with the finger 26 is a tripping-lever 27, pivotally connected at its lower end by a rod 28 with the framework of the machine. The tripping-lever 27 has central pivotal connection 29 with a slidable bar 30. The bar carries at its inner end a vertical rod 31, which has a link connection 32 at its upper end with a weight 33, slidable upon the scale-beam. The weight is provided with a roller 34 to travel on the scale-beam. The tripping-lever is held in normal position by a coil-spring 62, connected at its inner end with the framework. A rod 35 projects downwardly from the weight into a guide-loop 36, carried by the bar 30.

In order to direct the milk into the weighing and receiving tanks, I provide the following mechanism: Adjustably connected to the tripping-lever 27 is an arm 37, extending downwardly at the side of the machine. The adjustable connection between the arm 37 and the tripping-lever 27 consists of a pin 38, extending through one of the holes 39 in the tripping-lever and through an opening in the end of the arm 37. Slidably supported below the lower end of the arm 37 in bearings 40 is a plunger-rod 41, provided with a handle 42. The framework alongside the rod is provided with a parallel slot 43 to receive one of the checks 44. Each check is provided upon its upper edge with a pair of notches constituting right-angled shoulders 45 and 46. A bar 47, carried by the plunger-rod, carries an upwardly and inwardly turned flange 48, adapted to engage with the rear end of the check in the slot, as shown in Fig. 9. The lower end of the arm 37 is formed with an inwardly-turned flange 49, which is adapted to drop in front of the shoulder 46. Upward movement of the arm 37 is limited by a guide-rod 50, standing above the inwardly-turned flange 49 upon the lower end of said arm. Accidental backward movement of the check is prevented by a lever 51, having hinge-support 52 at its rear end and at its forward end having an upwardly and inwardly turned flange 53, adapted to make contact with the shoulder 45. In order to lock the plunger in forward position, I provide a catch 54, carried by the framework and adapted to pass through an opening 55 in the side of the flange 56 of the plunger-rod, the plunger-rod then being turned to interlock with the catch, as shown in Figs. 12 and 13. In order to lift the arm 37 out of contact with the check when the plunger is withdrawn, I provide a finger 57, carried by the plunger-rod, which engages with an outwardly-turned finger 58, carried by the arm 37, thus lifting said arm out of engagement with the check. In order to prevent floating of the weighing-bucket, and thus delivery of a greater amount of milk into the receiving-tank than arranged for, I provide the receiving-tank with an overflow-pipe 59, connected with the pipe leading to the reserve-tank.

The machine is used as follows, the parts being in the position shown in Fig. 1: A series of checks 44 are provided, each check having a shoulder 46 in a different place than upon the other checks. We will assume that the customer has delivered to the creamery one hundred pounds of milk and that there is to be returned to him ninety pounds. In delivering his milk he will receive a check marked "One hundred pounds," and the connection 38 will be adjusted so that the check received by the customer will actuate the apparatus sufficiently to cause ninety pounds of milk to flow into the weighing-bucket and receiving-tank. The check being placed in the slot 43, the rod 41 will be shoved forwardly to bring the flange 48 against the check, as shown in Fig. 9. Continued forward movement of the rod will carry the check forward in the slot, the rod being turned and locked in forward position by the catch 54. Before this takes place the arm 37 will drop by gravity, so that its lower end will pass into the slot which forms the shoulder 46 upon the check and the shoulder 46 upon the check, abutting against the flange 49 of said arm, will carry the arm forward with the plunger-rod and turn the tripping-lever 27 upon its support into the position shown in Fig. 2, allowing the valve 19 to close by gravity. This movement of the tripping-lever draws with it the bar 30 and through the connected parts also draws with it the weight 33 upon the scale-beam. This moves the scale-beam upon its pivotal support from the position shown in Fig. 1 to the position shown in Fig. 2, turning the separating-pipe carried by the scale-beam into registering position with the ports 9 and 10, leading into the weighing-bucket and receiving-tank. The milk will then flow through said ports into said bucket and the receiving-tank, the ports being so positioned that a certain proportion—say one-tenth—of the milk passes into the weighing-bucket and nine-tenths into the receiving-tank. When nine pounds of milk has passed into the weighing-tank, the weight of the milk in the weighing-tank will overbalance the weight 33, turning the scale-beam back into the position shown in Fig. 1 and diverting the flow of milk to the reserve-tank. The plunger-rod then being released and withdrawn will cause the weight to slide to the inner end of the scale-beam, carrying the upper end of the trip and lever 27 against the trip 26 to open the valve 19 in the weighing-bucket, allowing the milk in the weighing-bucket to pass into the receiving-tank. This movement of the parts also carries the lever-arm 37 back into normal position. The customer's portion of milk now being in the receiving-tank, he can receive the same therefrom by opening the valve 60 in the outlet-pipe 61. To receive a greater quantity of milk, a check would be used with the shoulder 46 in a position to move the lever 37 a greater distance, and to receive a less quantity of milk the check would have the shoulder 46 in position to actuate the lever 37 and connected parts a lesser degree.

Having now described my invention, what

I claim as new, and desire to secure by Letters Patent, is—

1. In combination a reserve-tank, a receiving-tank, a weighing-bucket arranged in connection with said receiving-tank, and means for directing a flow of milk from said reserve-tank to the receiving-tank, and for directing a predetermined portion of said flow into said weighing-bucket.

2. In combination a reserve-tank, a receiving-tank, a weighing-bucket in said receiving-tank, and means for directing a flow of liquid from said reserve-tank to said receiving-tank and diverting a portion of said flow into said weighing-bucket and for stopping the flow into said tank and bucket when a predetermined amount has passed into said bucket.

3. In combination a reserve-tank, a receiving-tank, a scale-beam, a weighing-bucket supported by said scale-beam within said receiving-tank, a valve-controlled outlet in said bucket, a weight carried by said scale-beam, and means for actuating said weight to tilt said scale-beam and thereby direct a flow of liquid from said reserve-tank into said receiving-tank and weighing-bucket the amount passing into said weighing-bucket bearing a predetermined ratio to the amount passing into said receiving-tank, the valve in said bucket being closed during the passage of said milk thereinto, and means for returning said scale-beam to normal position thereby stopping the flow of liquid into said receiving-tank and weighing-bucket and opening the valve in said bucket.

4. In combination a reserve-tank, a circulating-pipe leading from said tank, means for pumping liquid from said tank through said pipe, a receiving-tank and a weighing-bucket arranged in said receiving-tank, a scale-beam supporting said weighing-bucket, a valve arranged in connection with an outlet-opening in said bucket, a weight carried by said scale-beam, means for actuating said weight to divert the flow of liquid from said circulating-pipe into said receiving-tank and weighing-bucket, a predetermined portion of said liquid passing into said weighing-bucket, and means for returning said parts to normal position.

5. In combination a reserve-tank, a circulating-pipe connected with said reserve-tank, means for normally causing a flow of liquid from said tank through said pipe, a receiving-tank, a bucket arranged in said tank, a scale-beam supporting said bucket, a valve arranged in connection with an outlet-opening in said bucket, means for closing said valve and for diverting the flow of liquid from said circulating-pipe into said receiving-tank and weighing-bucket, a predetermined portion of said liquid passing into said bucket, and means for actuating said scale-beam to return the parts to normal position when a predetermined amount of the liquid has passed into said weighing-bucket.

6. In combination a reserve-tank, a circulating-pipe connected with said tank, means for causing a flow of liquid from said tank through said pipe, a receiving-tank, a weighing-bucket arranged in said receiving-tank, a valve arranged in connection with an outlet-opening in said bucket, a scale-beam supporting said bucket, a weight slidable upon said scale-beam, means for closing said valve and for sliding said weight upon said scale-beam to raise said bucket and to divert the flow of liquid from said pipe into said receiving-tank and weighing-bucket, a predetermined portion of said liquid passing into said bucket, and means for restoring the parts to normal position when a predetermined measure of said liquid has passed into said bucket.

7. In combination with a reserve-tank, a circulating-pipe connected with said tank, means for pumping liquid from said tank through said pipe, a receiving-tank, a weighing-bucket arranged in said receiving-tank, a valve arranged in an outlet-opening in said bucket, a scale-beam supporting said bucket, a weight slidable upon said scale-beam, check-controlling mechanism for sliding said weight upon said scale-beam to raise said bucket and to divert the flow of liquid from said circulating-pipe into said receiving-tank and weighing-bucket, a predetermined portion of said liquid passing into said bucket, and means for restoring said weight to normal position and opening said valve when a predetermined portion of the liquid has passed into said bucket.

8. In combination a reserve-tank, a circulating-pipe connected with said tank, means for pumping liquid from said tank through said pipe, a receiving-tank, a weighing-bucket arranged in said receiving-tank, a valve arranged in connection with an outlet-opening in said bucket, a scale-beam supporting said bucket, a weight slidable upon said scale-beam, a tripping-lever connected with said weight, a check-controlled slidable bar for actuating said tripping-lever to slide said weight upon said scale-beam to raise said bucket and to divert the flow of liquid from said pipe into said receiving-tank and weighing-bucket, and means for restoring the parts to normal position.

9. In combination a reserve-tank, a circulating-pipe connected with said tank, means for pumping liquid from said tank through said pipe, a receiving-tank, a weighing-bucket arranged in said receiving-tank, a valve arranged in connection with an outlet-opening in said bucket, a scale-beam supporting said bucket, a weight slidable upon said scale-beam, a conduit carried by said scale-beam and forming part of said circulating-pipe, a tripping-lever arranged in connection with said bucket-valve and scale-weight, and a check-controlled slidable actuating-plunger for said tripping-lever, for the purpose set forth.

10. In combination a reserve-tank, a circulating-pipe connected with said tank, means for pumping liquid from said tank through said pipe, a receiving-tank, a weighing-bucket arranged in said receiving-tank, a valve arranged in connection with an outlet-opening in said bucket, a scale-beam supporting said bucket, a weight slidable upon said scale-beam, a conduit carried by said scale-beam and forming part of said circulating-pipe, a tripping-lever arranged to actuate said scale-beam to divert the flow of liquid through said conduit into said bucket and receiving-tank and to actuate the valve of said bucket to open the same, and means for actuating said tripping-lever, consisting of a slidable plunger arranged alongside a check-receiving slot, means carried by said plunger for sliding a check in said slot, and means carried by said tripping-lever in position to be engaged by said check.

11. In combination a reserve-tank, a circulating-pipe connected with said tank, means for causing a flow of liquid from said tank through said pipe, a receiving-tank, a weighing-bucket arranged in said receiving-tank, a valve arranged in an outlet-opening in said bucket, a scale-beam supporting said bucket, a weight slidable upon said scale-beam, a conduit carried by said scale-beam and forming part of the circulating-pipe, said conduit having passages for registering with a return-pipe leading to the reserve-tank and with passages for registering with said receiving-tank and weighing-bucket, an actuating-trip for said scale-beam weight and bucket-valve, actuating means for said trip consisting of a slidable plunger, a check, means carried by said plunger to engage with said check and carry it forwardly with the plunger, means carried by the trip in position to be engaged by said check in its forward travel, and a stop arranged in position to engage with said check and prevent backward movement.

12. In combination a reserve-tank, a circulating-pipe connected with said tank, means for pumping liquid from said tank through said pipe, a receiving-tank provided with an overflow-conduit connected with said circulating-pipe, a weighing-bucket arranged in said receiving-tank, a valve arranged in connection with an outlet-opening in said bucket, a scale-beam supporting said bucket, a weight slidable upon said scale-beam, a conduit carried by said scale-beam and forming part of the circulating-pipe, said conduit being provided with passages for registering with a return-pipe leading to said reserve-tank and with passages for registering with said receiving-tank and weighing-bucket, an actuating tripping-lever for said scale-weight and valve, and means for actuating said tripping-lever consisting of an arm connected with said lever, a plunger slidably supported adjacent to the free end of said arm, a check-receiving slot parallel with said plunger, means carried by said plunger for engaging with a check in said slot to carry the same forward with the plunger, a downwardly-projecting arm carried by said tripping-lever in position to be engaged by said check in its forward travel, a pivotally-supported stop arranged in position to engage with said check and prevent return movement, and means for locking said plunger in forward position.

In testimony whereof I affix my signature in presence of two witnesses.

ROBERT C. MEALEY.

Witnesses:
H. S. JOHNSON,
EMILY F. OTIS.